April 2, 1929.  W. NEUSIIS  1,707,410
HARROW ATTACHMENT FOR TRACTORS
Filed June 24, 1925  2 Sheets-Sheet 1
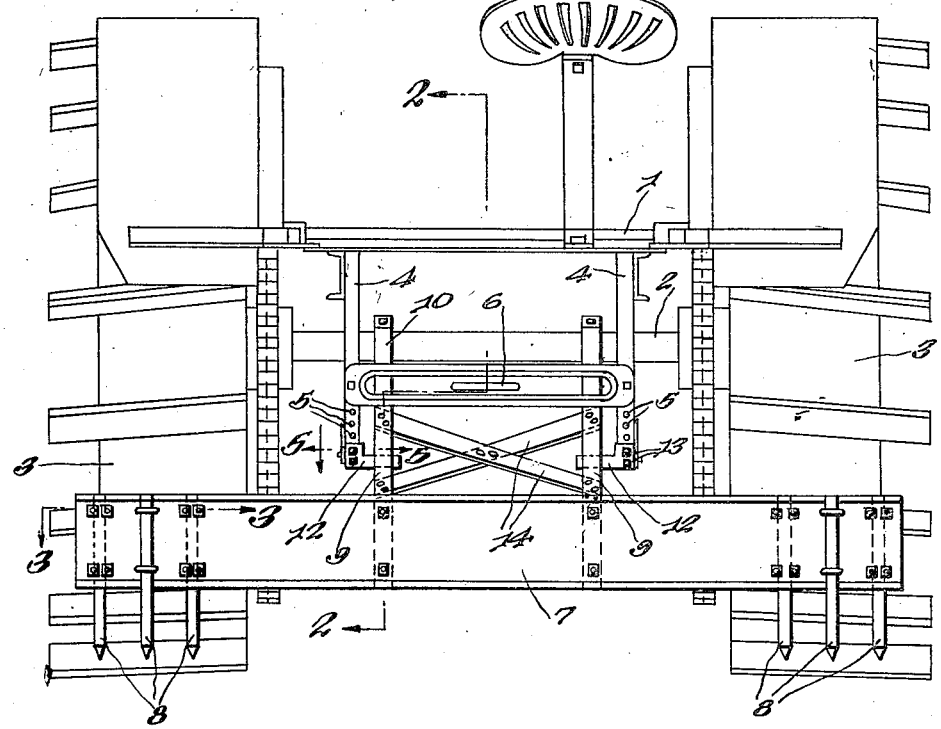
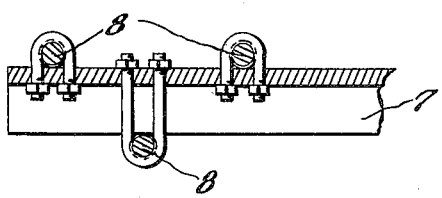
Wm Neusiis
INVENTOR
BY Victor J. Evans
ATTORNEY

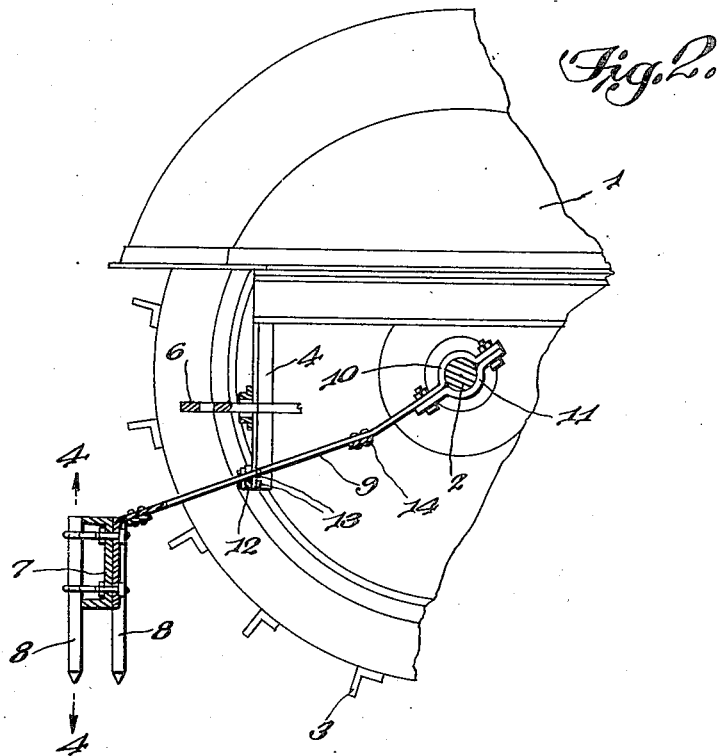
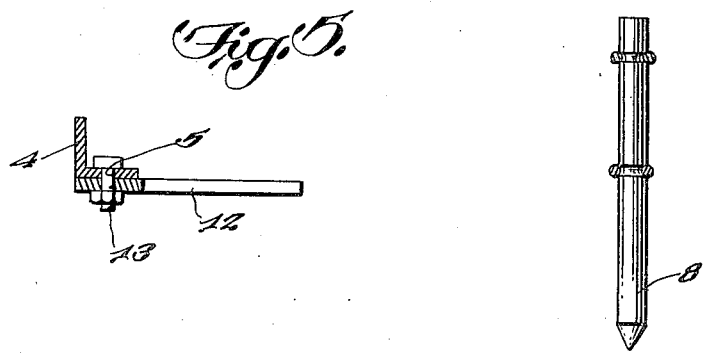

Patented Apr. 2, 1929.

1,707,410

UNITED STATES PATENT OFFICE.

WILLIAM NEUSIIS, OF YORKVILLE, ILLINOIS.

HARROW ATTACHMENT FOR TRACTORS.

Application filed June 24, 1925. Serial No. 39,364.

This invention relates to new and useful improvements in tractor attachments and more particularly to a harrow attachment for tractors. The main object of my invention is the provision of a harrow attachment for tractors adapted to loosen the soil of cultivated ground after the traction wheels of the tractor have passed thereover.

In seeding a piece of ground prepared for the same where the seeder is drawn over the ground by a tractor, the traction wheels of the tractor have a tendency to pack the earth so that it is almost impossible to properly seed that portion over which the traction wheels travel and in order to overcome this objection, I have provided an improved attachment for tractors whereby the harrow teeth are provided so as to be dragged through the earth following the passage thereover of the traction wheels so that it may loosen the soil at this point and prepare the soil for the proper seeding.

Another object of the invention is the provision of a harrow attachment whereby the device may be quickly and readily attached to well known types of tractors and at the same time is rendered adjustable relative to the tractor itself so that the same may be raised and lowered with respect to the surface over which the tractor is travelling in order to gauge the depth of penetration of the harrow teeth.

With the above and other objects in view, my invention consists in the novel features of construction and the combination and arrangement of parts to be hereinafter more fully described, pointed out in the claims and shown in the accompanying drawings, in which:

Fig. 1 is a rear elevation of a tractor illustrating my improved attachment applied thereto, Fig. 2 is a transverse sectional view on the line 2—2 of Fig. 1, Fig. 3 is a detailed section on the line 3—3 of Fig. 1, Fig. 4 is a detailed section on the line 4—4 of Fig. 2, and Fig. 5 is a detailed section on the line 5—5 of Fig. 1.

Referring more particularly to the drawings, I have illustrated a rear elevation of a tractor which includes a frame 1, axle 2 and traction wheels 3. Suspended from the frame are spaced angular brackets 4 which are provided with a plurality of openings 5 which are generally used for adjusting the relative positions of the draw bar 6; however these openings may also be used for adjustment of my improved harrow attachment.

The harrow attachment comprises a U shaped body bar, 7, which has bolted thereto the harrow teeth 8 and in order to support the harrow teeth in the proper position, relative to the traction wheels 3, attention is first directed to the fact that the teeth 8 are bolted to the body member 7 at each end thereof, a number of teeth being provided at each end of the body, so that the teeth are disposed in alignment with the traction wheels 3 of the tractor.

Supporting arms 9 are provided, the outer ends of which are bolted to the intermediate portion of the body 7 in spaced relation and thence extend upwardly and clamp to the axle 2 of the tractor.

The forward ends of the arms 9 are provided with concave portions 10 adapted to fit over the axle 2 and are securely held thereon by means of the clamping plates 11 which are bolted to the inner ends of the arms 9 as is clearly illustrated in Fig. 2.

In order to support the harrow body in its proper position, adjustable supporting fingers 12 are provided, the outer ends of which are bolted into the lower ends of the portions 4 adapted to have bolts 13 extending through the openings 5 in said brackets. The fingers 12 extend inwardly from the brackets 4 and engage beneath the supporting arms 9 for the harrow body.

At this point I wish to call attention to the fact that the arms 9 are provided with cross braces 14 which extend at an angle to each other and at their ends secured to the arms 9 in order to brace these arms and provide rigidity to the harrow construction. It will be apparent from the foregoing that I have provided an improved harrow attachment for tractors wherein after the traction wheels of the tractor have passed over the tilled surface, the harrow teeth 8 will loosen the surface and prepare the same for the proper seed. The device is extremely simple in construction and can be quickly and readily attached to the various well known makes of tractors and is so mounted for the same that it may be readily adjusted to determine the depth to which it is desired to have the harrow teeth penetrate these surfaces and the device may be quickly and readily attached to a tractor and detached therefrom.

While I have shown and described the preferred form of my invention, it will be obvious that various changes in the details of construction and in the proportions may be resorted to for successfully carrying my invention into practice without sacrificing any of the novel features of construction or departing from the scope of the appended claims.

Having thus described my invention, what I claim is:

1. In combination with a tractor including a frame, an axle, traction wheels supporting the axle, a harrow attachment including a bar disposed at the rear of said tractor in parallel relation with said axle, said bar having teeth thereon disposed in alignment with said traction wheels, and means for supporting said bar including vertically disposed bars carried by said frame, supporting arms carried by said axle and connected to said bar, and means for supporting said arms from said vertical bars whereby said tooth carrying bar may be adjusted relative to the ground to be traversed by said tractor and such that said arms and bar may freely move upwardly from said supporting means.

2. In combination with a tractor including a frame, an axle, traction wheels supporting the axle, a harrow attachment including a bar disposed at the rear of said tractor in parallel relation with said axle, said bar having teeth thereon disposed in alignment with said traction wheels, and means for supporting said bar including vertically disposed bars carried by said frame having aligned openings therein at the lower ends thereof, supporting arms carried by said axle and connected to said tooth carrying bar intermediate the ends thereof, said arms extending past said vertically extending bars, fingers carried by said bars and adapted to engage and support said arms, and means adapted to extend through certain of said aligned openings and openings in said fingers so as to detachably connect said fingers to said vertically extending bars whereby said tooth carrying bar may be adjusted relative to the ground to be traversed by said tractor by disposing said securing means in different of said aligned openings.

In testimony whereof I affix my signature.

WILLIAM NEUSIIS.